Jan. 7, 1941.  A. H. TINNERMAN  2,227,608
BROILER
Filed Feb. 24, 1939  2 Sheets-Sheet 2
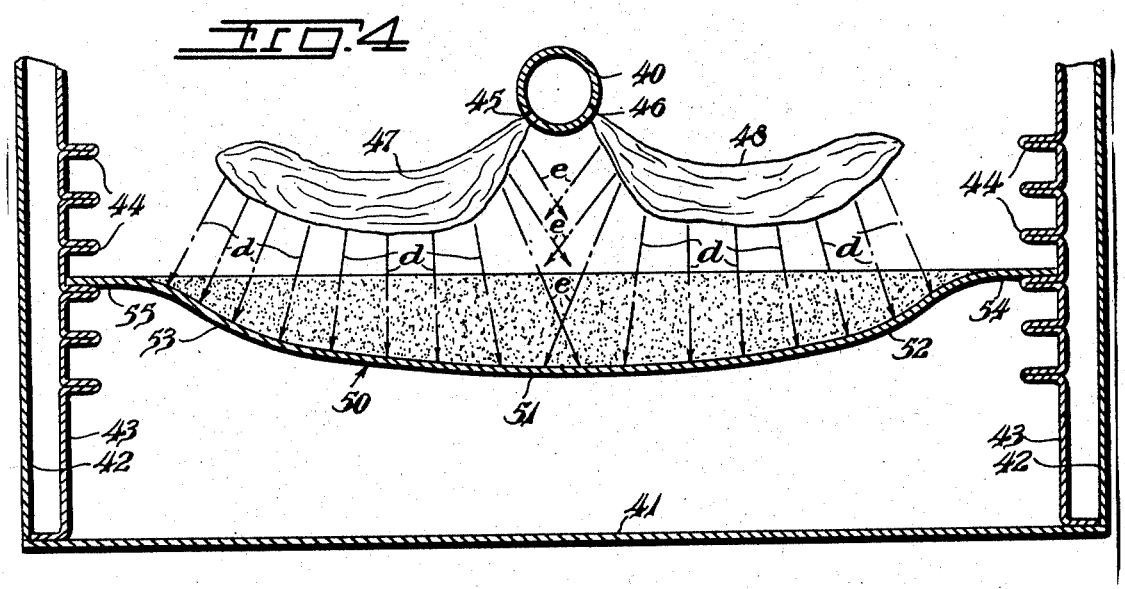
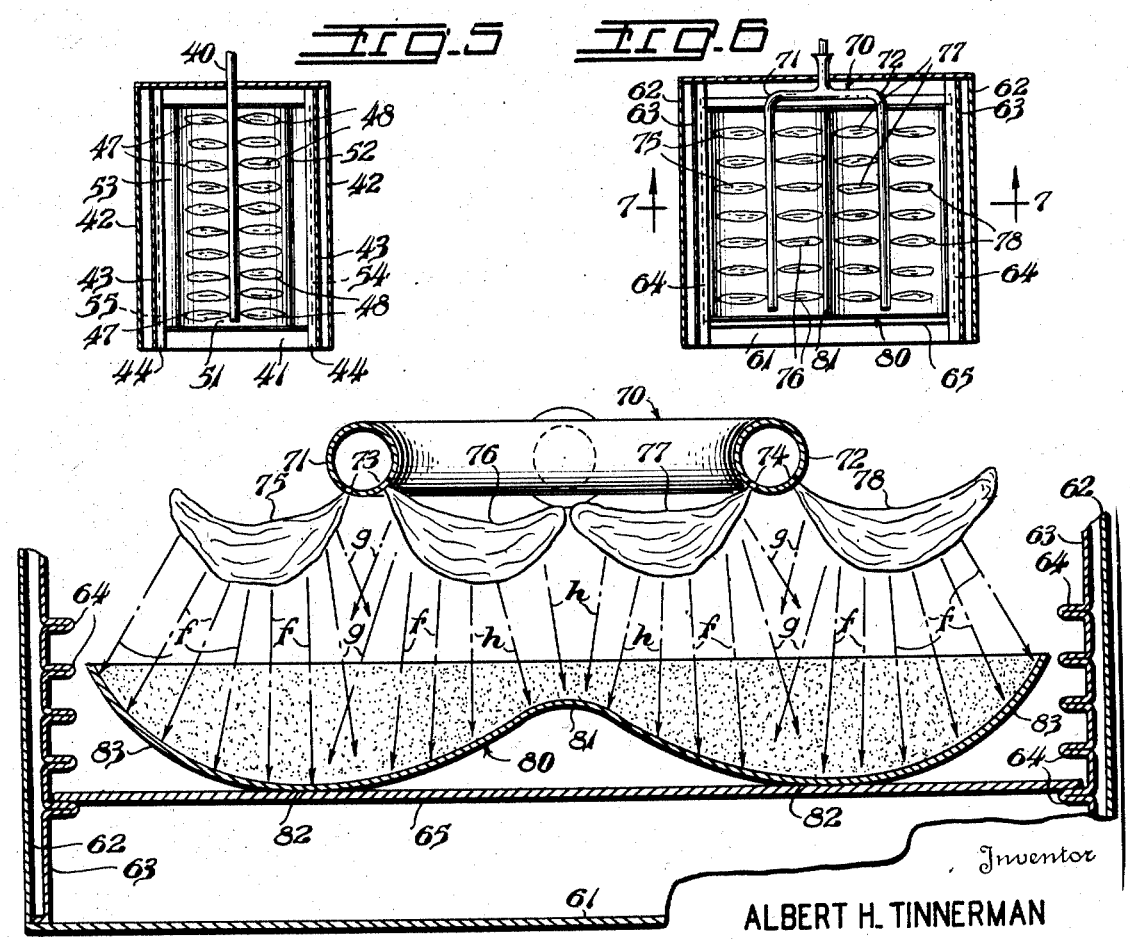
Inventor
ALBERT H. TINNERMAN
By H. G. Lombard
Attorney Patented Jan. 7, 1941

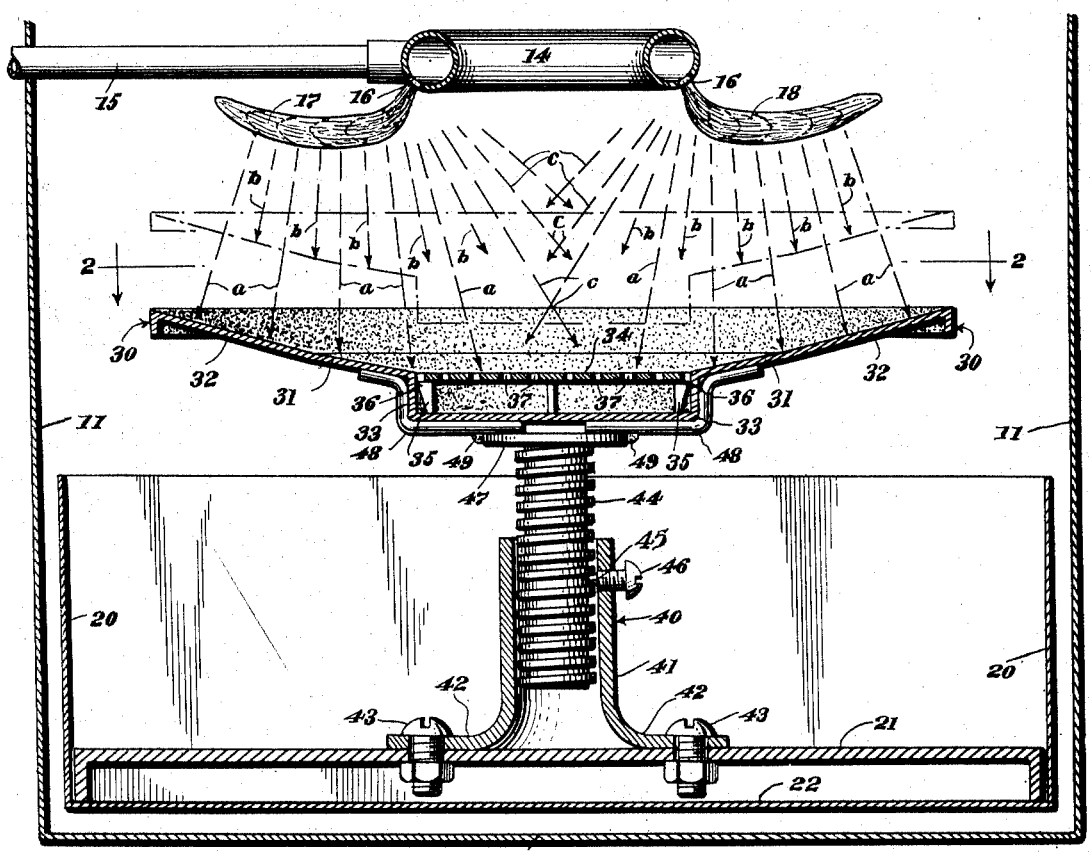

2,227,608

UNITED STATES PATENT OFFICE 2,227,608

BROILER

Albert H. Tinnerman, Cleveland, Ohio, assignor to Tinnerman Products, Inc., Cleveland, Ohio, a corporation of Ohio Application February 24, 1939, Serial No. 258,296

10 Claims. (Cl. 126—41)

This invention relates in general to improvements in the art of cooking and deals, more particularly, with an improved apparatus for a form of oven cooking commonly known as broiling.

In broiling foods, it is well known that best results are obtained by exposing the article cooked in proximity to a source of heat such that the radiated heat rays subject the food to an appropriate temperature which is maintained until the cooking is finished. In the average type of broiler now in use, the flames issuing from the burner or other heating element employed radiate heat onto a broiler pan or grille having a substantially flat food supporting surface. Under such circumstances, flames in the more usual substantially horizontally arcuate form for example, do not subject the food on such a flat supporting surface to an even distribution of heat since the heat rays from the end portions of such flames have less effective intensity than those radiated upon the center area of the broiler pan surface.

This unequal distribution of heat is therefore to be considered as due primarily to the fact that those rays radiated toward the center area of the broiler pan are required to travel less distance to impinge upon the food than those rays directed toward the food supported in the area surrounding such center area of the broiler pan. Thus, that portion of the food in the center area of the broiler is necessarily subjected to a greater quantity of heat such that in a given period the food in such area is usually cooked considerably more than the remaining portions thereof. And accordingly, in order to obtain satisfactory results despite this circumstance, broiling of foods has heretofore required that the cooking be carried on at a not too rapid rate or too near the source of heat with the result that what should logically be a simple cooking operation often requires an exceptional degree of skill and continuous watchfulness and attention.

It is also well known that in the usual broiling procedure only one surface of food is exposed to the heating source thus requiring that the food be repeatedly turned over such that the two sides of the food are successively exposed to the heat. In broiling meat for example, this procedure is objectionable not only because of the loss of desirable juices from the meat but also by reason of the fact that the oven compartment on being opened necessarily cools and thereby prolongs the time of cooking.

A primary object of the present invention aims to provide an arrangement overcoming all the foregoing insufficiencies of the prior art structures in the provision of a broiler pan or food support having a surface or contour designed in accordance with the general path of heat radiation or theoretical effective heat line of a heating element in any of the various degrees of intensity thereof. A broiler pan having a food supporting surface of this character therefore assumes the form most nearly perfect for supporting the food with respect to the heating element in a manner to ensure an equal distribution of heat thereon in providing for an even, uniform cooking of the food throughout. For purposes of illustration, a preferred form of the invention is shown and described in connection with a substantially round gaseous fuel burner providing generally downwardly and outwardly directed flames from around the periphery thereof, the intensity of such flames being governed by the amount of fuel allowed to pass to the burner in any suitable manner. It will be quite obvious however, from the description which follows, that the invention is equally adaptable to use with various other equivalent forms of heating elements simply by designing the size, shape and proportion of the respective parts of the apparatus as may be necessary or desirable.

In combination with a broiler pan or other food support designed in accordance with general path of heat radiation from a heating element as aforesaid, there is provided a novel form of adjusting means whereby the broiler pan may be readily raised or lowered as desired in order that the food thereon may be properly positioned with respect to the burner flames in accordance with the selected degree of intensity thereof, yet with the same even, uniform, equal distribution of heat radiated thereon.

It is therefore a further primary object of the invention to provide a broiler apparatus of the character described including a vertical adjusting means for the broiler pan adapted to position the same in any selected position with respect to the source of heat and comprising a substantial screw bolt coupling operable by simple turning force exerted on the broiler pan or associated part.

Another object is to provide such a broiler unit with means adapted to readily collect the natural juices and greases extracted from the foodstuffs being cooked without danger of smoldering smoking or catching on fire to possibly burn the foodstuff being cooked and otherwise render such greases and juices unfit for later use.

Still another object is to provide a broiling unit of the type described designed to avoid the demand for constant attention and care in broiling and eliminating the necessity for frequent turning over of the food to successively expose the surfaces thereof to a single heat source, thereby enabling the attendant to perform various other duties while the food is being cooked.

A further object of the invention is to provide an apparatus requiring considerably less time for broiling than is more usually the case by reason of the ability to employ a hotter heat source accelerating the speed of cooking without danger of ignition of the greases or juices or of the food itself.

A still further object is to provide an improved means for broiling purposes designed to produce a more rapid and effectual application of heat to the food products, with a more uniform cooking thereof, to preserve to a large extent the natural juices and flavor of the food, and ensure complete combustion of all vapors arising from the food in the process of cooking, to the end that smoke and objectionable odors are substantially eliminated.

Further objects and advantages of the invention and other new and useful features in the construction, arrangement and general combination of parts thereof will be readily apparent to those skilled in the art as a description proceeds with reference to the accompanying drawings in which like reference characters designate like parts throughout the same and in which:

Fig. 1 represents a section taken through an oven compartment, as viewed from the front, illustrating the improved broiler or food support provided with a central cover plate assembled in the pit for receiving the greases or juices in the broiling of the foodstuffs;

Fig. 2 is a plan view of the broiler pan surface taken on section line 2—2 of Fig. 1 looking in the direction of the arrows;

Fig. 3 is a perspective of the pit cover plate per se shown in the assembly of Fig. 1;

Fig. 4 is a fragmentary vertical section through an oven compartment showing another embodiment of the invention comprising a substantially straight burner;

Fig. 5 is a horizontal sectional view through an oven compartment such as represented in Fig. 4 showing on a reduced scale the straight burner illustrated and the general disposition of the flames therefrom with respect to the food support;

Fig. 6 is a similar view of a further form of the invention embodying a substantial horse-shoe burner or parallel straight burners; and, Fig. 7 is a section taken along line 7—7 of Fig. 6 looking in the direction of the arrows.

Referring to Fig. 1, a preferred embodiment of the invention is shown in connection with an oven compartment comprising a bottom wall 10 and upright side walls 11 presenting a front opening adapted to be closed by a door or other panel closure usually forming a part of the outer imperforate front surface of a stove or range. In the upper portion of the oven compartment, there is mounted in any suitable manner a heating element such as a burner 14 connected with a fuel pipe 15 and having ports 16 spaced determinately thereabout designed to provide flames such as 17, 18, sweeping generally downwardly and outwardly in substantially horizontal, arcuate relation as indicated, the various degrees of intensity of such flames being represented by the transverse dotted lines. It will be understood that the burner illustrated in Fig. 1 is substantially round but of course may be straight, rectangular or of other suitable form so long as the contour of the food support employed therewith is designed to conform to the predetermined path of effective heat radiation thereof, as presently to be described. The fuel line 15 leading thereto is of the type usually connected with a mixing bell adapted to receive a supply of gaseous fuel and primary air in the ordinary manner while the orifices 15 thereof are diagonally positioned so as to emit substantially horizontal, arcuate flames directed downwardly and outwardly in this instance, in opposite directions from opposing sides of the round burner into the area of the primary combustion chamber formed between the burner and the broiler pan or food support.

The broiler itself and the mounting means therefor are usually arranged in an oven compartment drawer designated generally 20, the same being fixedly mounted with respect to the bottom wall 22 thereof and preferably by means of a separate base 21 which is rigidly positioned in assembled relation in said drawer but is readily removable therefrom such that the broiler and its mounting means are adapted to be easily and quickly removed as a unit thus permitting the oven compartment to serve a dual purpose as when it is desired to place a relatively large pan therein for roasting purposes, for example.

The food support comprising a grill or broiler pan 30 is provided with an adjustable mounting means in the manner of a preferred form of screw jack coupling 40, presently to be described, which permits the same to be vertically adjusted by a simple rotary movement whereby the food support may be raised or lowered with respect to the burner as necessary or desired in accordance with any of the various degrees of flame intensity thereof. The said food support may be constructed in the form of an enlarged plate-like member from any suitable material such as wire to provide a substantial grid or grating, or in the manner of a sheet metal stamping or the like forming the desired form of grill or broiler pan. However, in the present example, the food support is preferably provided in the manner of a casting for several decided advantages most important of which resides in the fact that the relatively thick metal of a casting absorbs considerably more heat under the customary pre-heating of the oven preparatory to use and thus offers greater searing qualities to the underside of the food placed thereon in the subsequent cooking operation. Similarly, in broiling meat for example, the substantially smooth surface obtainable in a casting provides for direct, close and substantially flush contact of the broiler pan surface with the entire underside of the meat thus ensuring maximum searing qualities and an even, uniform cooking of the meat or other foodstuff in this respect. The broiler pan otherwise embodies a substantially dished or generally concave contour comprising inclined merging face portions 31, 32 sloping toward the approximate central or depressed area thereof, and it will be appreciated that such inclined face portions of the broiler pan may be readily designed in practically any case to the contour of the general path of effective heat radiation of the heating element intended to be used, as hereinafter more fully set forth.

A dished or curved broiler pan of this character may of course be provided as a unitary plate-like casting having a continuous, unbroken center area formed with suitable openings, if desired, into which juices and greases from the article cooked may pass and be collected in some convenient manner without danger of smoldering, smoking or possibly catching on fire, resulting in burning of the meat or other foodstuff and rendering such greases and juices unfit for later use in preparing dressings or gravies. A preferred arrangement for this purpose contemplates the provision of a substantal well or pit 33 in the depressed or center area of the broiler pan into which the juices and greases may be collected and shielded from the heating element during the cooking operation. Since in the present example, the food support is formed in the manner of a casting, such pit construction may be provided for at little or no increase in the cost of manufacture, and of course designed for use with or without a cover plate. If an open pit is employed, the same is made deep enough to retain the juices and greases collected therein sufficiently removed from the heating element at a point in which they are shielded from the burner flames and can not smolder or ignite. Preferably, a suitable cover plate 34 is provided for the pit in the manner of a simple disk, the same being smaller in size than said pit to seat therein with a slight clearance around its periphery as best seen in Fig. 2. To maintain such clearance and also to suitably position the cover plate in the general contour of the broiler pan supporting surface as shown in Fig. 1, said cover plate is provided with legs 35 having substantial shoulders 36 projecting beyond the periphery thereof and abutting the adjacent side walls of the pit to maintain the desired clearance, aforesaid.

Thus it will be appreciated that the said sloping surfaces 31, 32 of the broiler pan allow the juices and greases to flow freely toward the depressed or central area of the pan and through said clearance between the cover plate and adjacent walls of the pit or wall to be collected at the bottom of such pit where they are shielded from the burner flames by the cover plate and thus prevented from smoking, smoldering or igniting in any such manner as would cause a burning of the meat or other foodstuff and otherwise render the juices or greases unfit for later use. If desired, the cover plate may be provided with any suitable form of perforations 37 to further facilitate the passage of the juices into the well; however this is merely a matter of choice and the cover plate may be provided as a simple imperforate body since usually the clearance of the cover plate in the well is entirely sufficient for passing all juices and greases into the pit.

In the provision of the food support with a generally curved or dished contour in the manner aforesaid, there is obtained a considerably greater effective broiling area than is possible in the use of a substantial flat grill, pan or other food support of similar size and accordingly, a still further advantage of the present invention resides in the fact that more food and larger pieces of meat may be supported on the broiler pan to be subjected to an even distribution of heat ensuring a uniform cooking thereof throughout.

As previously set forth, one of the most important features of the present invention resides in the provision of a broiler pan, grill or food support 30 with a surface designed in accordance with the general path of heat radiation or theoretical maximum effective heat line of the heating element in any of the various degrees of intensity thereof and for any position of vertical adjustment of the food support with respect to such heating element. Thus in the present example, the burner 14 will emit the general type of horizontally arcuate flames 17, 18, shown, which flames will have for example in one intensity the general path of effective heat radiation indicated by the long arrows a pointing to the full line showing of the broiler pan surface. Likewise, in a position of vertical adjustment of the broiler pan closer to the source of heat as indicated by the broken line showing in Fig. 1, the general path of effective heat radiation would be substantially that indicated by the shorter arrows b, it being understood that the flames are of reduced intensity as may be necessary or desirable for such position of vertical adjustment of the broiler pan.

Accordingly in direct contrast to heretofore known arrangements embodying substantially flat food supporting surfaces, the food support of the present invention is designed with a surface other than flat and having, more particularly a contour conforming to this general path of effective heat radiation. In the present example, this contour assumes the form of substantially dished or curved configuration and the grill or broiler pan surface being designed to conform thereto, ensures maximum broiling efficiency inasmuch as the same follows as nearly as possible the effective line or path of heat radiation in direct proportion to the size, degree and angulation of the horizontally arcuate flames 17, 18 in any selected degree of intensity thereof. In this respect it will be understood that the broiler pan surfaces 31, 32, surrounding the central or depressed area thereof including cover plate 34, receive substantially direct heat rays radiating from those horizontally arcuate portions of the flames not adjacent the orifices 16. These rays, with respect to a flat plane surface, naturally give off quantities of heat diminishing in degree toward the extremities of the flames but since the surfaces 31, 32 of the instant broiler pan or grill construction are provided of a sloping contour as aforesaid, rising in elevation toward the extremities of the flames, said broiler pan surface is designed in accordance with the general path of most effective heat radiation of said flames, wherefore the broiler pan surface in all portions surrounding the central or depressed area thereof is necessarily subjected to substantially equal quantities of heat by said direct rays.

By reason of such dished contour of the food support, the center area thereof comprising the central cover plate 34 in the present example, is the farthest from the flames but in such area the flames radiate more heat through what may be termed double radiation induced by the reflected or crossed heat rays c from the inner sides of the downwardly projected portions of the flames immediately adjacent the burner. Such reflected or crossed rays thereby provide the necessary quantity of heat in the center or depressed area of the broiler pan in any position of adjustment thereof, and accordingly, these crossed rays together with the direct rays aforesaid radiate substantially an equal amount of heat upon the entire food supporting surface of the broiler pan such that the article cooked is necessarily subjected to an even, uniform cooking throughout.

The broiler pan or food support in this instance is preferably mounted for any selected vertical adjustment in the oven compartment by means of screw bolt coupling 40 including means on which the broiler pan is removably supported and may be readily raised or lowered with respect to the burner by a simple turning movement thereof. The adjustable coupling comprises preferably a supporting socket 41 provided with a flange 42 fixedly secured to the separate, removable base 21 as by bolts 43, and having an unthreaded bore designed to freely receive a substantial screw bolt spindle 44 formed with square threads in threaded engagement with the pilot extremity 45 of a fixedly secured set screw 46 threaded into an opening in the hub of said supporting socket.

The spindle 44 is provided at its outer end with an enlarged head 47 to which a plurality of fingers 48, constructed preferably of wire, are rigidly secured as by spot welding 49. Said fingers are suitably arranged around said spindle head and formed with bent portions in a manner to present a substantial basket for removably receiving the projecting bottom portion of the pit or well 33 in the center or depressed area of the broiler pan with the extremities thereof supporting the adjacent undersurfaces of the pan to provide the desired strength and rigidity in the completed form of the broiler unit.

It will be observed that the only element threadedly engaging the square threads of the screw bolt spindle 44 is the pilot extremity 45 of the set screw 46 and this is most important to ensure an easy, ready rotation of the spindle about its axis regardless of the temperature of the oven. This arrangement has been found considerably more practical than one embodying the more common standard screw threads on the spindle engaging complementary threads in the bore of the socket, since in any such arrangement the thread surfaces in direct engagement with each other have a decided tendency to become seized under even a slight temperature with the result that the spindle binds in the socket and vertical adjustment of the food support after a period of use under a high temperature becomes quite difficult and in some instances is impossible without allowing the oven to cool to a point at which it would be practical to forcibly turn the spindle. In contrast, in the set screw arrangement herein disclosed there are no threads to become seized since the set screw pilot 45 engages only a small portion of a single thread on the spindle such that it is impossible for the spindle to bind in the supporting socket and the food support is always readily adjustable regardless of the temperature of the oven.

Although in the present example the coupling members, comprising screw threaded spindle 44 and socket 41, are preferably employed with the socket element fixedly secured to the removable base 21 and the spindle provided with means removably supporting the broiler pan, it is fully intended within the scope of this invention that these parts be provided in reversed relation if desired whereby the screw threaded spindle would be fixedly secured to said base or with the bottom wall 22 of the drawer 20. In any event, a rigidly mounted combined broiler and drawer unit is provided which is withdrawably contained in the oven compartment of a range or the like having a heating element arranged adjacent the top of the compartment, substantially in the manner aforesaid. And with one of said coupling members thus rigidly secured with respect to the bottom wall 22 of the drawer, the food support is therefore most effectively adapted for vertical adjustment inasmuch as there is no relative movement of the mounting therefor with respect to the removable base 21 and no movement of said base in the drawer unit, wherefore the broiler pan or grill may be readily raised or lowered toward and from the heating element by a simple rotation thereof in a minimum of effort and with freedom from all difficulties.

Figs. 4 and 5 illustrate another embodiment of the invention comprising a substantially straight burner 40. Such a burner is employed, for example, in an oven compartment comprising bottom and side walls 41, 42 and partition walls 43 provided with inwardly projecting abutments 44 on which the flanges of a food support 50 or a shelf supporting the same may be slidably mounted. The said straight burner 40 is provided with diagonally disposed ports 45, 46, emitting substantially horizontal arcuate flames 47, 48 directed generally downwardly and outwardly in opposite directions into the area of the primary combustion chamber between the burner and food support. Thus, as described with reference to the form of the invention shown in Fig. 1, substantially direct rays represented by arrows $d$ are radiated from those portions of the flames spaced from the burner ports while from the inner sides of the flames adjacent the burner ports, relatively more heat is radiated, as previously explained, through the double radiation induced by the reflected or crossed heat rays indicated by the arrows $e$. Accordingly, following the general teachings of the invention, the food support 50 is provided of a contour conforming substantially to this general path of effective heat radiation and will assume substantially the form represented in Fig. 4 embodying a generally dished or depressed central area 51 receiving the crossed rays $e$ and merging with sloping side surfaces 52, 53, which rise in elevation in accordance with the contour of the end portions of the flames wherefore an equal distribution of heat will be radiated on the food support throughout in any degree of intensity of the flames. Although the food support is shown provided with flanges 54, 55 designed to rest on the stepped abutments 44 of the partition walls in any selected position of vertical adjustment with respect to the heating element, it is quite obvious that any other suitable mounting means may be employed without departing from the spirit and scope of the invention.

Figs. 6 and 7 show another form of the invention embodying a substantial horse-shoe burner or parallel straight burners employed, for example, in an oven compartment similar to that described with reference to Fig. 4 comprising bottom and side walls 61, 62, and partition walls 63 provided with projecting abutments 64 on which a suitable shelf 65 may be slidably mounted at its ends to maintain a grill or broiler pan food support in any selected position of vertical adjustment with respect to the heating element.

The burner 70 comprises a pair of arms 71, 72 each provided with series of ports 73 and 74 extending along the length thereof to emit pairs of oppositely extending flames 75, 76 and 77, 78 respectively, Fig. 6. The said ports are diagonally disposed to direct the flames generally downwardly and outwardly in opposite directions from each burner arm substantially as shown in Fig. 7. As in the previously described forms of the invention, the general effective path of heat radiation of such a heating element may be determined by the direct rays radiated from the middle and end portions of a flame together with crossed or reflected heat rays taking place through double radiation of heat from the flames immediately adjacent each burner arm. Thus in this form of burner, the direct rays from the flames will be substantially as indicated by the arrows $f$ while the crossed or reflected heat rays will occur substantially as represented by the crossed arrows $g$ from those portions of the flames 75, 76 and 77, 78, immediately adjacent the burners 71, 72 respectively.

In the area of the adjacent end portions of the inner flames 76, 77, there is of course the natural tendency of the heat to rise with the direct rays in such area of the burner indicated by the arrows $h$ of less intensity than the other direct rays $f$ wherefore suitable provision must be made in the design of the grill or broiler pan 80 in order that the food supporting surface thereof will have a contour conforming to such area of the general path of effective heat radiation of this form of heating element. Accordingly, the food support 80 is designed substantially as shown in Fig. 7 in the manner of substantial convexities and concavities comprising a middle raised portion 81 presenting a supporting surface closer to the end portions of flames 76, 77 than the remaining intermediate portions 82 which merge into the sloping side faces 83 rising in elevation in accordance with the general contour of the end portions of the outer flames 75, 78. Thus the food supporting surface follows as closely as possible the general path of effective heat radiation of the direct rays $f$ and $h$ and the crossed rays $g$, substantially in the manner aforesaid, such that an equal distribution of heat is radiated thereupon throughout, thereby ensuring an even, uniform cooking of the food supported thereby in the cooking operation.

While the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. Means for cooking comprising a heating element providing a source of heat having a curvature due to convection currents and a supporting means holding the article cooked in proximity to said heating element, said supporting means having a supporting surface designed in accordance with the curvature and general path of effective heat radiation of said source of heat provided by the heating element.

2. Means for cooking comprising a supporting member holding the article cooked in proximity to a source of heat having a curvature due to convection currents and having a predetermined maximum effective heat line in any degree of intensity thereof, said source of heat being of less area than the area of said supporting member, said supporting member having a supporting surface of a curvature conforming substantially to that of the source of heat and said heat line thereof such that an equal distribution of heat is radiated thereon, whereby the article supported is subjected to an even, uniform cooking throughout.

3. A broiler of the character described comprising a source of heat issuing a flame of elongated generally arcuate configuration having a curvature due to convection currents, a supporting member holding the article cooked in proximity to said flame, said source of heat being of less area than the area of said supporting member, said supporting member having a supporting surface conforming substantially to the general path of effective heat radiation defined by the curvature of said flame, whereby an article placed thereon receives an equal distribution of heat ensuring an even, uniform cooking thereof throughout.

4. A broiler of the character described comprising a source of heat issuing a flame of generally horizontal arcuate configuration having a curvature due to convection currents, a supporting member holding the article cooked in proximity to said flame, said source of heat being of less area than the area of said supporting member, said supporting member having a supporting surface of generally dished contour conforming substantially to the general path of effective heat radiation defined by the curvature of said flame of generally horizontal arcuate configuration, whereby substantially all points on the supporting surface are equidistant from the source of heat such that the article cooked receives an equal distribution of heat ensuring an even, uniform cooking thereof throughout.

5. Means for cooking comprising a heating element providing a source of heat having a curvature due to convection currents and a supporting member holding the food cooked in proximity to said heating element, said source of heat being of less area than the area of said supporting member, said supporting member having a food supporting surface designed in accordance with the curvature and general path of effective heat radiation of said source of heat, said supporting member having a pit for receiving the juices and greases extracted from the food in the cooking operation, said pit shielding the juices and greases collected therein from the source of heat.

6. Means for cooking comprising a heating element providing a source of heat having a curvature due to convection currents and a supporting member holding the food cooked in proximity to said heating element, said source of heat being of less area than the area of said supporting member, said supporting member having a food supporting surface of a curvature designed in accordance with the curvature and general path of effective heat radiation of said source of heat, said supporting member having a pit for receiving the juices and greases extracted from the food in the cooking operation, and a cover for said pit shielding the juices and greases collected therein from the source of heat.

7. Means for cooking comprising a supporting member holding the article cooked in proximity to a source of heat having a curvature due to convection currents, said source of heat having a predetermined maximum effective heat line in any degree of intensity thereof, said source of heat being of less area than the area of said supporting member, and said supporting member having a supporting surface of a contour conforming substantially to the curvature of said source of heat and said heat line thereof such that an equal distribution of heat is radiated thereon, said supporting member having a pit for receiving the juices and greases extracted from the article cooked, and a cover for said pit shielding such juices and greases from the source of heat, said cover having a surface lying in the general contour of said supporting surface of the supporting member, whereby the article placed on said supporting surface is subjected to an even uniform cooking throughout.

8. A broiler of the character described comprising a burner issuing flames of generally horizontal arcuate configuration each having a curvature due to convection currents, said flames extending in opposite directions from said burner, a supporting member holding the article cooked in proximity to said flames, said supporting member having a supporting surface of generally concave contour comprising a dished center area and sloping sides conforming substantially to the curvature and general path of effective heat radiation of said flames of generally horizontal arcuate configuration, whereby the article cooked receives an equal distribution of heat ensuring an even, uniform cooking thereof throughout.

9. A broiler of the character described comprising a substantially straight burner issuing flames of generally horizontal arcuate configuration each having a curvature due to convection currents, said flames extending in opposite directions from said straight burner, a supporting member holding the article cooked in proximity to said flames, said supporting member having a supporting surface of generally concave contour designed in accordance with the curvature of said flames comprising a dished center area conforming substantially to the general path of the crossed rays from said flames and sloping sides corresponding to the contour of the effective heat path of the direct rays from said flames, whereby the article cooked receives an equal distribution of heat ensuring an even, uniform cooking thereof throughout.

10. A broiler of the character described comprising a burner having a pair of substantially parallel burner arms issuing flames of elongated generally arcuate configuration from opposite sides of each burner arm providing inner flames and outer flames having curvatures due to convection currents, a supporting member holding the article cooked in proximity to said flames, said supporting member having a supporting surface conforming substantially to the curvature and general path of effective heat radiation of said flames including a raised portion corresponding to the general path of heat of the adjacent end portions of the inner flames whereby an article placed thereon receives an equal distribution of heat ensuring an even, uniform cooking thereof throughout.

ALBERT H. TINNERMAN.